United States Patent [19]
Hirai et al.

[11] Patent Number: 5,817,440
[45] Date of Patent: Oct. 6, 1998

[54] SILVER HALIDE PHOTOSENSITIVE MATERIAL FOR COLOR FILTER AND METHOD FOR PRODUCING COLOR FILTER USING THE SAME

[76] Inventors: Hiroyuki Hirai; Makoto Machida, both of c/o Fuji Photo film Co., Ltd, 210, Nakanuma, Minami Ashigara-shi, Kanagawa, Japan

[21] Appl. No.: 804,382

[22] Filed: Feb. 21, 1997

[51] Int. Cl.⁶ .................................................. G02B 5/20
[52] U.S. Cl. .............................. 430/7; 430/363; 430/383; 430/503; 430/504; 430/945
[58] Field of Search ................................ 430/7, 363, 383, 430/503, 504, 945

[56] References Cited

U.S. PATENT DOCUMENTS 5,571,663  11/1996  Hirai .......................................... 430/504

FOREIGN PATENT DOCUMENTS

| 0662635 | 7/1985 | European Pat. Off. . |
| 0713137 | 5/1996 | European Pat. Off. . |
| 62-71950 | 4/1987 | Japan . |
| 62-148952 | 7/1987 | Japan . |
| 63-261361 | 10/1988 | Japan . |

Primary Examiner—John A. McPherson

[57] ABSTRACT

A silver halide photosensitive material for a color filter comprising at least three silver halide emulsion layers having different spectral sensitivities and each silver halide emulsion layer contains couplers which form blue, green and red by coupling reaction with the oxidation product of a developer, wherein the amount of the couplers in a red coloring layer is adjusted so that each transmission density of the yellow and magenta dye components measured when all the couplers in the red coloring layer are subjected to color development is 1.5 or more, and a black matrix part becomes substantially black of transmission density of 2.5 or more when all the couplers on a support are subjected to reaction.

3 Claims, 3 Drawing Sheets

SILVER HALIDE PHOTOSENSITIVE MATERIAL FOR COLOR FILTER AND METHOD FOR PRODUCING COLOR FILTER USING THE SAME

FIELD OF THE INVENTION

The present invention relates to a silver halide photosensitive material suitable for producing a color filter which comprises red, green and blue parts excellent in a spectral transmission characteristic, has a thin film thickness and excellent in flatness capability, and a method for producing such a color filter using the same. The present invention further relates to a silver halide photosensitive material suitable for producing easily a color filter which comprises a black part of high density, and a method for producing such a color filter using the same.

BACKGROUND OF THE INVENTION

A color filter is used for a color face plate for a cathode-ray tube display, a photoelectric conversion element plate for copying, a filter for a single tube type color television camera, a flat panel display using liquid crystal, an element of a color solid state camera tube, and the like.

A color filter generally used comprises three primary colors of red, green and blue regularly set in array, but some comprise four or more colors as needed. For example, a black pattern (a black matrix) is required for various purposes in a color filter for a camera tube or a color filter for a liquid crystal display device.

Specific examples of arrangements of red, green and blue include mosaic, stripe, delta arrays or the like which can be selected as needed.

Conventionally known manufacturing methods of color filters include an evaporation method, a dyeing method, a printing method, a pigment dispersing method, an electrodeposition method, an electrodeposited resist transfer method, etc. However, these methods have drawbacks such that producing processes are complicated, color filters obtained by these methods are liable to generate pinholes and scratches, yields are bad, accuracy is lacked or the like.

As a means to solve these drawbacks, manufacturing methods of color filters using silver halide photosensitive materials have been discussed such as a coupler-in-developing solution type developing method (disclosed in, e.g., JP-A-55-6342) (the term "JP-A" as used herein refers to a "published unexamined Japanese patent application") and a coupler-in-emulsion type developing method (disclosed in, e.g., JP-A-62-148952 and JP-A-62-71950). However, the former method requires at least three times of color development, accordingly, the processing step cannot be said to be simple. Further, in the latter method the film thickness becomes thick and there are problems such that film peels off during rubbing processing in LCD panel production process and breaking of wire is liable to occur. As a means to solve these problems, reducing the coating amount of binder has been discussed but it has been found that other problems have been risen such as color mixing is liable to occur, and blur is caused in a pixel pattern due to heat in the LCD panel production process.

Further, it is desired from the viewpoint of the color reproducibility that each of three primary colors of red, green and blue of a color filter has high light transmittance as long as possible in the wavelength region of from 600 to 660 nm, from 520 to 580 nm and from 420 to 480 nm, respectively, and does not transmit light in other regions of wavelengths. A silver halide photosensitive material for a general color photograph comprises three silver halide emulsion layers each having different spectral sensitivities and each layer contains dye donating compounds such as cyan, magenta and yellow couplers one by one. Therefore, it was found that when a color filer is produced using such a material, the above-described preferred color reproduction cannot be obtained. That is, for example, as the red color and the blue color of a color filter are formed of the same magenta coupler, when a magenta coupler is selected so as to increase the transmittance of the light in the red region, the transmittance of the light in the blue region is inversely reduced. Further, as the green color and the blue color are formed of the same cyan coupler, when a cyan coupler is selected so as to increase the transmittance of light in the green region, the light in the red region is transmitted. Therefore, it was found that primary colors are very difficult to be reproduced desirably. Moreover, as dyes are formed by the reaction of these couplers with the oxidation product of a developer but a developer is contained in a color developing solution, therefore, it is common to every coupler, accordingly, the hues of the dyes formed are limited. To cope with this problem, a silver halide photosensitive material for a color filter is disclosed in JP-A-63-261361 in which couplers are contained in respective silver halide emulsion layers having different spectral sensitivities in combination so as to form red, green and blue colors. Color reproducibility was certainly improved by this method but it was found that light shielding capability was insufficient to form a black matrix part with the same photosensitive material. To cope with this problem, it is proposed in JP-A-8-22108 to introduce the fourth silver halide emulsion layer which contains a coupler for correcting color such that a black part becomes substantially black of transmission density of 2.5 or more when all the couplers on a support are subjected to reaction. According to this method, a color filter comprising red, green and blue parts excellent in a spectral transmission characteristic and a black part (a black matrix part) of high density can be produced but further improvements are required in the point of the increment of the film thickness and the complexity of pattern exposure.

SUMMARY OF THE INVENTION

Accordingly, one object of the present invention is to provide a color filter which is thin in film thickness, less in color turbidity and does not generate blur due to heat, and which comprises red, green and blue parts excellent in a spectral transmission characteristic and a black part.

Another object of the present invention is to provide a color filter which does not need a complicated producing process, which is suitable for mass production, has a black part of high optical density, and in which defects are not liable to be caused in an LCD panel production process.

The above objects of the present invention have been attained by the following means.

(1) A silver halide photosensitive material for a color filter comprising at least three silver halide emulsion layers having different spectral sensitivities and each silver halide emulsion layer contains couplers which form blue, green and red by coupling reaction with the oxidation product of a developer, wherein the amount of the couplers in a red coloring layer is adjusted so that each transmission density of the yellow and magenta dye components measured when all the couplers in the red coloring layer are subjected to color development is 1.5 or more, and a black matrix part becomes substantially black of transmission density of 2.5 or more when all the couplers on a support are subjected to reaction.

(2) A method for producing a color filter having blue, green and red pixel patterns and black matrix comprises exposing the silver halide photosensitive material as described in (1) above using a laser beam or a light emitting diode so that the blue, green and red pixel patterns are exposed with a smaller quantity of light than the black matrix, color developing and desilvering.

DETAILED DESCRIPTION OF THE INVENTION

The present invention is described in detail below.

Figure 1:
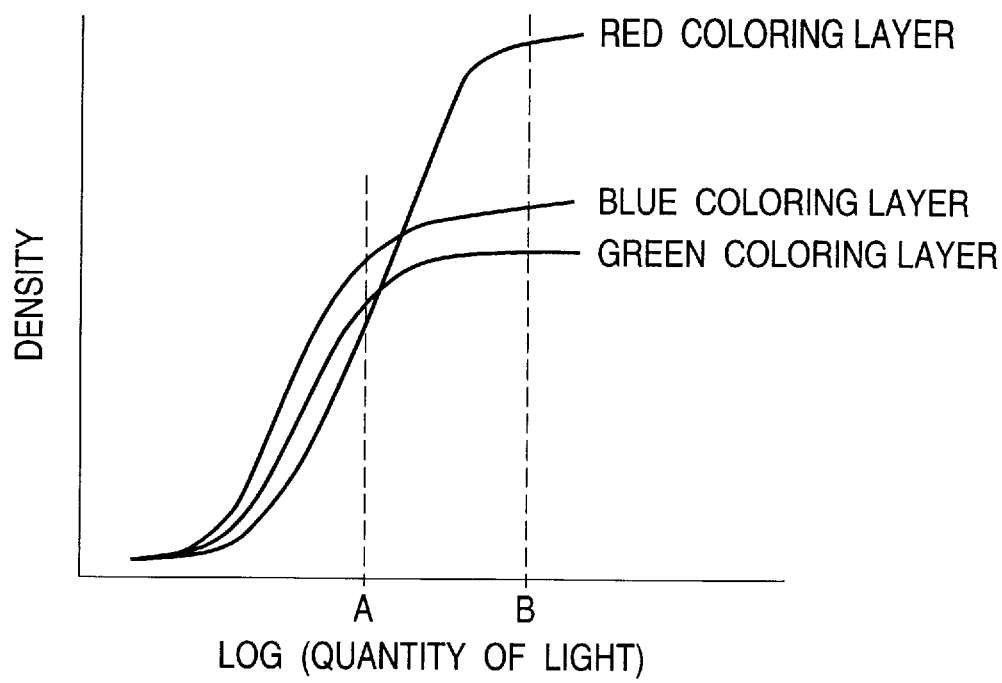
FIG. 1 is a graph showing a characteristic curve of a photosensitive material which can be used in the present invention.

The present invention is based on the discovery that when a black matrix part is formed using a silver halide photosensitive material in which couplers are contained in combination in silver halide emulsion layers each having different light sensitivities so as to form respectively blue, green and red colors of good color reproducibility and high light transmittance by coupling reaction with the oxidation product of a developer, the amount of the magenta dye component (a component which has absorption in the wavelength of from 500 to 580 nm) in the black part is particularly small. It was found, at the same time, that if the amount of the couplers in a red coloring layer is adjusted so that each transmission density of the yellow and magenta dye components which is measured with a transmission densitometer X-Rite with the exposure amount A as shown in FIG. 1 when all the couplers in the red coloring layer are subjected to color development is 1.5 or more, preferably from 1.8 to 3, and if the transmission density of the magenta dye component when all the couplers on a support are subjected to reaction is 2.5 or more, substantial black of transmission density of 2.5 or more can be obtained. Light shielding capability of a black matrix part is preferably as high as possible, for example, transmission density of 3 or more is preferred. It was also found that in such a case the situation can be dealt with by increasing not only the amount of a coupler of a red coloring layer but also the amounts of couplers of a green coloring layer and a blue coloring layer from one time to two times of the amounts required to obtain a preferred green and blue filters, respectively.

The color density of a color filter is adjusted so as to satisfy the following two requirements: (1) whether backlight passed through all the R, G and B pixels is a white light similar to the light from a light source (well-balanced white light); (2) whether high transmittance (i.e., high brightness) is achieved. The preferred red color density in the present invention means a density of the red pixels of a color filter which meets the above requirements. When couplers (a yellow coupler and a magenta coupler) are incorporated in a red coloring layer in an amount 1.5 times the amount of the couplers required to obtain a preferred red color and all the couplers are subjected to color development (by exposing the photosensitive material with the exposure amount B as shown in FIG. 1, while the amount required to a preferred red color is shown as A in FIG. 1), the white balance is lost, resulting in a reddish white. In a color filter produced by incorporating couplers in an amount such that the red, green and blue color densities as described above into a color photosensitive material having the same constitution as the present invention, the black matrix part is inversely short of the red color density. The present invention overcomes this problem by increasing the amount of the couplers in the red coloring layer and subjecting all the couplers in the black matrix part to color development (by exposing the photosensitive material with the greater exposure amount B) to obtain a substantially black color and subjecting part of the coupler in the red pixel part to color development (by exposing the photosensitive material with the less exposure amount A).

A preferred red color in the present invention means the light transmittance at 620 to 680 nm is 60% or more and that at 420 to 540 nm is 10% or less. Further, a preferred green color in the present invention means the light transmittance at 520 to 560 nm is 40% or more and that at 420 to 440 nm and 640 to 680 nm is 10% or less, and a preferred blue color means the light transmittance at 430 to 480 nm is 50% or more and that at 570 to 680 nm is 10% or less. In addition, a substantial black color in the present invention means transmission neutral density (END) is 2 or more, preferably 2.5 or more.

A silver halide color photosensitive material for a color filter according to the present invention comprises a photosensitive silver halide emulsion layer for blue coloring, a photosensitive silver halide emulsion layer for green coloring, and a photosensitive silver halide emulsion layer for red coloring, and these layers have different spectral sensitivities each other.

In the present invention, at least a photosensitive silver halide emulsion layer for red coloring is constituted such that a preferred red density as a color filter is generated when exposed by the exposure amount lower than the exposure amount required to give maximum color density (exposure amount A), and red density of 1.5 times or more of the preferred red density is generated when exposed by the exposure amount higher than exposure amount A (exposure amount B). Exposure amount B is the same as or lower than the exposure amount required to give maximum color density but is the exposure amount higher than exposure amount A. Accordingly, a red pixel pattern is exposed by exposure amount A and a black matrix pattern is exposed by exposure amount B in the present invention.

When the amount of the coupler of a photosensitive silver halide emulsion layer for blue coloring or green coloring is increased for heightening the light shielding capability of a black matrix part, each emulsion layer is also constituted such that a preferred blue or green density as a color filter is generated when exposed by exposure amount A, and blue or green density of 1 or 2 times of the preferred blue or green density is generated when exposed by exposure amount B. Exposure amount A and exposure amount B may be the same or different between respective emulsion layers.

Specific embodiments of the present invention are described below.

Figure 2:
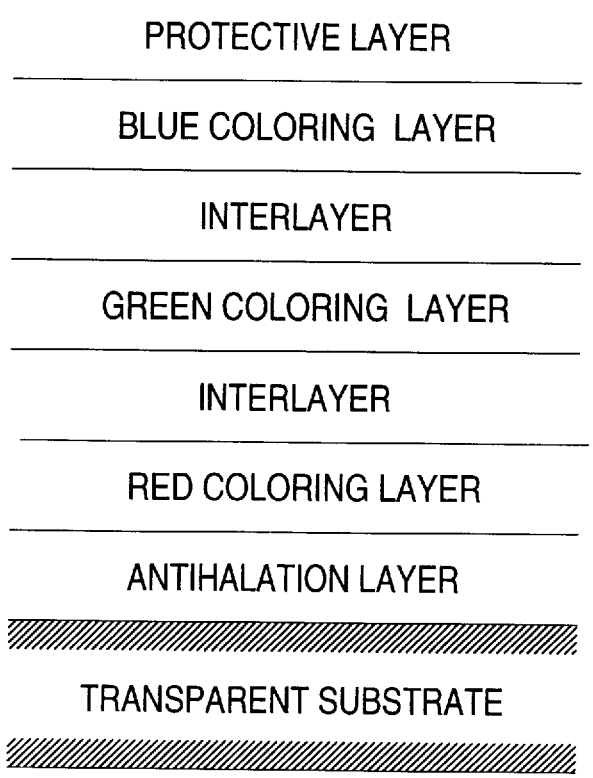
FIG. 2 is a type drawing showing the layer constitution of a photosensitive material which can be used in the present invention.
Figure 5:
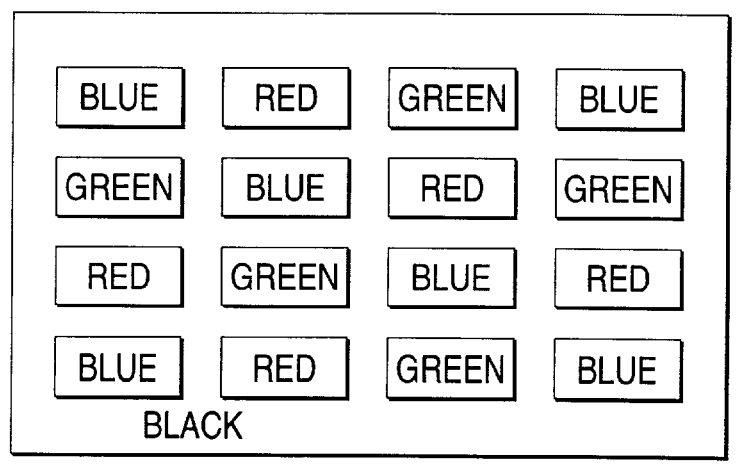
FIG. 5 is a type drawing showing the embodiment of an RGB color filter according to the present invention.

As one embodiment of the silver halide photosensitive material of the present invention, the material having the characteristic curve as shown in FIG. 1 (the layer constitution thereof is shown in FIG. 2) is used in which a photosensitive silver halide emulsion layer for blue coloring (a blue coloring layer) contains a cyan coupler and a magenta coupler (or a blue coupler), a photosensitive silver halide emulsion layer for green coloring (a green coloring layer) contains a cyan coupler and a yellow coupler, and a photosensitive silver halide emulsion layer for red coloring (a red coloring layer) contains a magenta coupler and a yellow coupler (or a red coupler). The material is digitally exposed using a light source whose light amount is adjusted to be capable of giving exposure at point A (the pixel part of R, G, and B) and point B (the black matrix part) shown in FIG. 1. Subsequently, the material is subjected to color development, desilvering and water washing, and a color filter colored red, green, blue and black (as shown in FIG. 5) is obtained.

Figure 3:
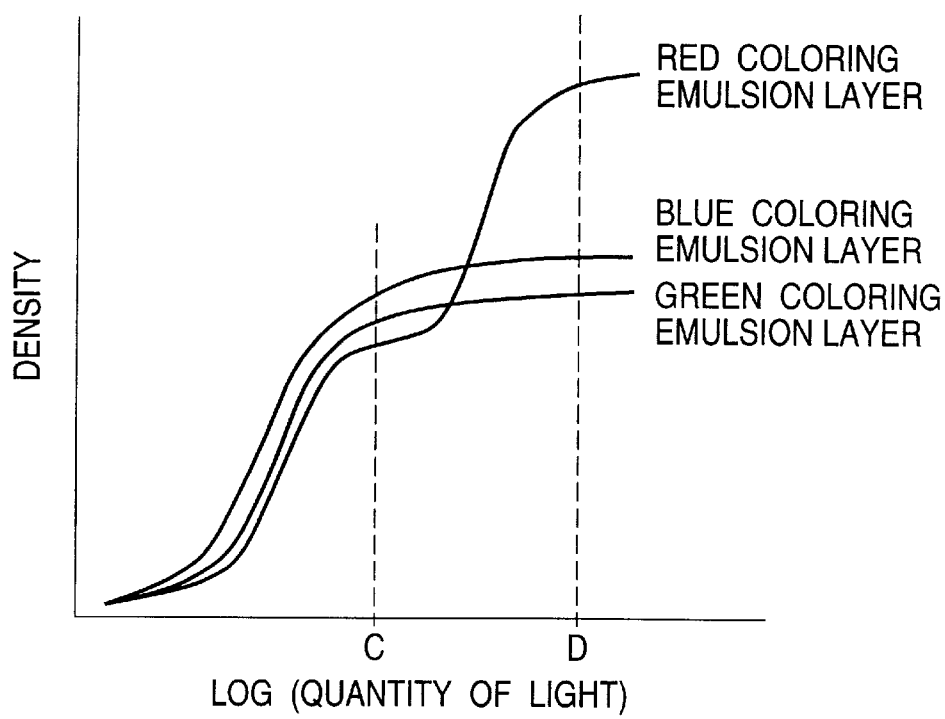
FIG. 3 is a graph showing a characteristic curve of a photosensitive material which can be used in the present invention.
Figure 4:
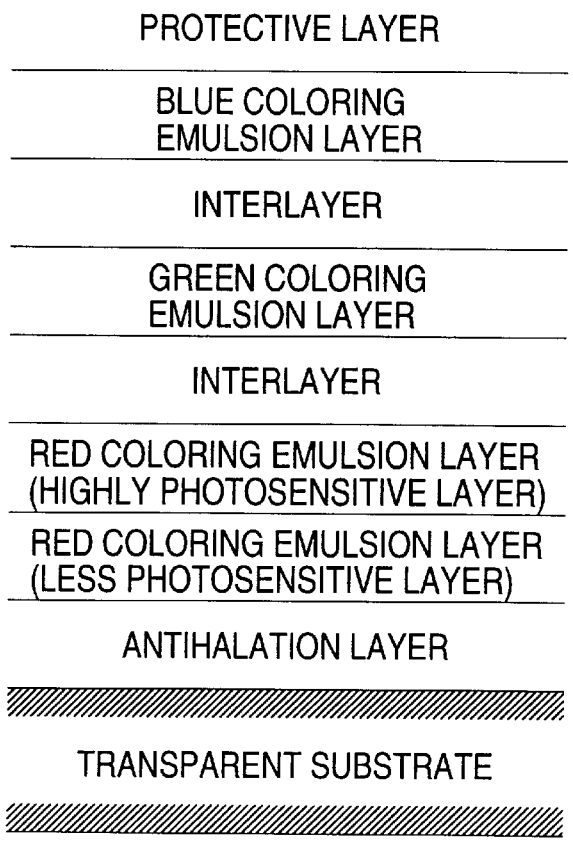
FIG. 4 is a type drawing showing the layer constitution of a photosensitive material which can be used in the present invention.

As another embodiment of the silver halide photosensitive material of the present invention, the material having the characteristic curve as shown in FIG. 3 (the layer constitution thereof is shown in FIG. 4) can be used. In this case, a red coloring emulsion layer comprises two unit emulsion layers each having different sensitivities, and the pixel part of red is exposed by light amount at point C and the black matrix part is exposed by light amount at point D which is more than that at point C. These two unit emulsion layers are not necessarily adjacent, and an emulsion layer having other spectral sensitivity and a light-insensitive layer may be interposed between them. Two unit emulsion layers each having different sensitivities can be applied to a green coloring and blue coloring emulsion layers, if required.

In the present invention, an exposure pattern, that is, a pixel pattern of a color filter, can easily be changed by digital exposure using at least three laser beams or light emitting diodes as a light source. A laser or a light emitting diode can be selected from various gas laser, liquid laser, solid state laser, semiconductor laser, semiconductor diode and the like according to the spectral sensitivities of the photosensitive materials which are used. In addition, exposure can be carried out using a wavelength transfer element of a combination of a nonlinear optical material and a coherent light source such as a laser beam, etc. A nonlinear optical element means a substance capable of manifesting nonlinearity between polarization and electric field which appears when strong photoelectric field such as a laser beam is given. Compounds which are preferably used as such substances include inorganic compounds represented by lithium niobate, potassium dihydrogenphosphate (KDP), lithium iodate, and $BaB_2O_4$, urea derivatives, nitroaniline derivatives, nitropyridine-N-oxide derivatives, e.g., 3-methyl-4-nitropyridine-N-oxide (POM), and the compounds disclosed in JP-A-61-53462 and JP-A-62-210432. A monocrystal optical waveguide type and a fiber type are known as the form of a wavelength conversion element and both of them are useful.

Exposing methods and exposing devices which can be used in the present invention are disclosed in JP-A-2-129625, JP-A-5-176144, JP-A-5-199372, JP-A-6-127021, JP-A-7-140567, JP-A-7-248549, JP-A-7-248541, JP-A-7-295115, JP-A-7-290760, JP-A-7-301868, JP-A-7-301869, JP-A-7-306481, JP-A-8-15788. Further, various laser exposure devices which are commercially available can of course be used. In the above photosensitive materials, spectral sensitivity is not limited to combinations of blue sensitivity, green sensitivity and red sensitivity, and may be combined with ultraviolet sensitivity, yellow sensitivity and infrared sensitivity, or a plurality of infrared sensitivities of different wavelength regions of photosensitivities may be adopted. The orders of coating of silver halide emulsion layers having different spectral sensitivities are not necessarily in the above-described order and can be set arbitrarily. Further, in addition to the above layer constitution, a subbing layer, an interlayer, a yellow filter layer capable of bleaching, a protective layer or an ultraviolet absorbing layer may be provided, if desired.

Silver halide grains which can be used in the photosensitive material of the present invention are silver chloride, silver bromide, silver iodochloride, silver chlorobromide, and silver iodochlorobromide. A silver chloride content is preferably 50 mol % or more and more preferably 80 mol % or more. A silver iodide content is preferably 2 mol % or less, more preferably 1 mol % or less, and still more preferably 0.5 mol % or less.

The crystal structure of the silver halide emulsion for use in the present invention may be uniform, or the grains may have a multilayered structure in which the interior and the surface of the grains comprise different halide compositions. Further, silver halides which have different compositions may be joined with epitaxial junction or may be joined with compounds other than a silver halide, such as silver thiocyanate or lead oxide.

In particular, in the high silver chloride content emulsion for use in the present invention, grains of the structure having silver bromide local phase in the interior and/or the surface of silver halide grains in a stratified or non-stratified structure as described above can also be used. The halide composition of the above-described local phase comprises preferably at least 20 mol % of silver bromide, more preferably exceeding 30 mol %. The silver bromide content of the silver bromide local phase can be analyzed by X-ray diffraction and the like. The application of X-ray diffraction to silver halide grains is disclosed, for example, in C. R. Berry and S. J. Marino, *Photographic Science and Technology*, Vol. 2, page 149 (1955) and ibid., Vol. 4, page 22 (1957). A silver bromide local phase can be present in the interior of a grain, on the edge or corner of the surface of a grain or on the plane but a preferred example is the structure in which a silver bromide local phase is joined on the corner of a grain by epitaxial junction.

The average grain size of the silver halide grains for use in the present invention is preferably from 0.05 to 0.9 μm and particularly preferably from 0.1 to 0.5 μm for the purpose of obtaining a large specific surface area and high development activity with a small amount of silver as far as possible. In the case of tabular grains, the thickness is preferably from 0.05 to 0.9 μm, in particular, from 0.1 to 0.5 μm.

A monodisperse emulsion having a narrow grain size distribution may be used. A monodisperse emulsion is, for example, a silver halide emulsion having such a grain size distribution as 80% or more of the entire grains account for within ±30% or less of the average grain size in terms of grain number or by weight. Further, a monodisperse silver halide emulsion having a variation coefficient of 20% or less, in particular, 15% or less, may be used.

A polydisperse emulsion having a broad grain size distribution may also be used.

The silver halide emulsions for use in the present invention can be prepared using the methods disclosed, for example, in *Research Disclosure (RD)*, Vol. 176, No. 17643 (December, 1978), pages 22 and 23, "I. Emulsion Preparation and Types", RD, No. 18716 (November, 1979), page 648, P. Glafkides, *Chimie et Physique Photographique*, Paul Montel (1967), G. F. Duffin, *Photographic Emulsion Chemistry*, Focal Press (1966), and V. L. Zelikman, et al., *Making and Coating Photographic Emulsion*, Focal Press (1964).

The monodisperse emulsions disclosed in U.S. Pat. Nos. 3,574,628, 3,655,394 and British Patent 1,413,748 are also preferably used.

Further, tabular grains having an aspect ratio of about 5 or more can be used in the present invention. Tabular grains can be easily prepared according to the methods disclosed, for example, in Gutoff, *Photographic Science and Engineering*, Vol. 14, pages 248 to 257 (1970), U.S. Pat. Nos. 4,434,226, 4,414,310, 4,433,048, 4,439,520 and British Patent 2,112,157.

Further, mixtures of grains which have various crystal forms may also be used.

A photosensitive silver halide emulsion is generally chemically sensitized. The photosensitive silver halide emulsion according to the present invention can be chemically sensitized with sensitizing methods known in the emulsions for general type photosensitive materials, for example, a chalcogen sensitizing method such as a sulfur sensitizing method, a selenium sensitizing method and a tellurium sensitizing method, a noble metal sensitizing method using gold, platinum and palladium, and a reduction sensitizing method, alone or in combination (e.g., disclosed in JP-A-3-110555). Sensitization can be carried out in the presence of a nitrogen-containing heterocyclic compound (e.g., disclosed in JP-A-62-253159). Further, the antifoggants described later can be added after completion of chemical sensitization. Specifically, the methods disclosed in JP-A-5-45833 and JP-A-62-40446 can be used.

Chemical sensitization is carried out at pH of preferably from 5.3 to 10.5, more preferably from 5.5 to 8.5 and at pAg of preferably from 6.0 to 10.5, more preferably from 6.8 to 9.0.

The coating amount of the photosensitive silver halide emulsion for use in the present invention is from 1 mg/m$^2$ to 10 g/m$^2$ in terms of silver.

For imparting spectral sensitivity such as green sensitivity, red sensitivity and infrared sensitivity to the photosensitive silver halide for use in the present invention, the photosensitive silver halide emulsion is spectrally sensitized with a methine dye or the like. Further, if necessary, a blue-sensitive emulsion may be spectrally sensitized in blue region.

Sensitizing dyes which are used include a cyanine dye, a merocyanine dye, a complex cyanine dye, a complex merocyanine dye, a holopolar cyanine dye, a hemicyanine dye, a styryl dye and a hemioxonol dye.

Specific examples of these sensitizing dyes are disclosed in U.S. Pat. No. 4,617,257, JP-A-59-180550, JP-A-64-13546, JP-A-5-45828, JP-A-5-45834, etc.

These sensitizing dyes may be used alone or in combination and, in particular, combinations of sensitizing dyes are often used for the purpose of supersensitization and the adjustment of the wavelength of spectral sensitivity.

A dye which does not provide a spectral sensitizing action by itself, or a compound which does not substantially absorb visible light but provides a supersensitization effect may be contained in the emulsion with a sensitizing dye (e.g., those disclosed in U.S. Pat. No. 3,615,641 and JP-A-63-23145).

These sensitizing dyes may be added to the emulsion during chemical ripening or before or after chemical ripening, or they may be added before or after the nucleation of silver halide grains according to U.S. Pat. Nos. 4,183,756 and 4,225,666. These sensitizing dyes and supersensitizers are added in the form of a solution of an organic solvent such as methanol, a dispersion of gelatin or the like or a solution of a surfactant. The addition amount is generally from 10$^{-8}$ to 10$^{-2}$ mol per mol of the silver halide.

Additives to be used in these processes are disclosed in the above RD, No. 17643 and RD, No. 18716, and RD, 307105 and the related locations of the disclosures are summarized in the table below.

| Type of Additives | RD 17643 | RD 18716 | RD 307105 |
|---|---|---|---|
| 1. Chemical Sensitizers | page 23 | page 648, right column | page 866 |
| 2. Sensitivity Increasing Agents | — | page 648, right column | — |
| 3. Spectral Sensitizers and Supersensitizers | pages 23–24 | page 648, right column to page 649, right column | pages 866–868 |
| 4. Brightening Agents | page 24 | page 648, right column | page 868 |
| 5. Antifoggants and Stabilizers | pages 24–25 | page 649, right column | pages 868–870 |
| 6. Light Absorbers, Filter Dyes, and Ultraviolet Absorbers | pages 25–26 | page 649, right column to page 650, left column | page 873 |
| 7. Dye image Stabilizers | page 25 | page 650, left column | page 872 |
| 8. Hardening Agents | page 26 | page 651, left column | pages 874–875 |
| 9. Binders | page 26 | page 651, left column | pages 873–874 |
| 10. Plasticizers and Lubricants | page 27 | page 650, right column | page 876 |
| 11. Coating Aids and Surfactants | pages 26–27 | page 650, right column | pages 875–876 |
| 12. Antistatic Agents | page 27 | page 650, right column | pages 876–877 |

The color developers for use in the present invention are not particularly limited so long as the oxidation products thereof produced by developing silver halide form dyes by coupling reaction with couplers, and they are well known in the photographic industry. Specific examples of color developers are described, for example, in T. H. James, *The Theory of the Photographic Process*, 4th Ed., pages 291 to 334 and 353 to 361. Particularly preferred color developers are p-phenylenediamine derivatives.

Various well known color couplers can be used in the present invention and specific examples thereof are disclosed in the patents described in the above *Research Disclosure* (RD), No. 17643, VII-C to G.

As the couplers for use in the present invention, two-equivalent color couplers substituted with a separating group are preferred to four-equivalent color couplers which have a hydrogen atom at the active coupling position, since the coating amount of silver can be reduced.

As yellow couplers which can be used in the present invention, oil-protect type acylacetamide based couplers are representative. Specific examples thereof are disclosed in U.S. Pat. Nos. 2,407,210, 2,875,057 and 3,265,506. Two-equivalent yellow couplers are preferably used in the present invention. Oxygen atom separating type yellow couplers disclosed in U.S. Pat. Nos. 3,408,194, 3,447,928, 3,935,501 and 4,022,620, and nitrogen atom separating type yellow couplers disclosed in JP-B-58-10739 (the term "JP-B" as used herein means an "examined Japanese patent publication"), U.S. Pat. Nos. 4,401,752, 4,326,024, RD, No.

18053 (April, 1979), British Patent 1,425,020, West German Patent Application Nos. 2,219,917, 2,261,361, 2,329,587 and 2,433,812 can be cited as representatives thereof. α-Pivaloylacetanilide based couplers are excellent in fastness of colored dyes, in particular, excellent in light fastness, on the other hand, α-benzoylacetanilide based couplers provide high color density.

Pyrazoloazole based couplers such as oil-protect type, preferably 5-pyrazolone based and pyrazolotriazole couplers can be used as magenta couplers in the present invention. 5-Pyrazolone based couplers in which the 3-position is substituted with an arylamino group or an acylamino group are preferred from the viewpoint of the hues of colored dyes and color density. Representative examples thereof are disclosed in U.S. Pat. Nos. 2,311,082, 2,343,703, 2,600,788, 2,908,573, 3,062,653, 3,152,896 and 3,936,015. As the separating group of 2-equivalent 5-pyrazolone based couplers, the nitrogen atom separating group disclosed in U.S. Pat. No. 4,310,619 and the arylthio group disclosed in U.S. Pat. No. 4,351,897 are particularly preferred. Further, the 5-pyrazolone based coupler having a ballast group disclosed in European Patent 73636 can provide high color density.

As pyrazoloazole based couplers, the pyrazolobenzimidazole couplers disclosed in U.S. Pat. No. 3,369,879, preferably the pyrazolo[5,1-c][1,2,4]triazole couplers disclosed in U.S. Pat. No. 3,725,067, the pyrazolotetrazole couplers disclosed in *Research Disclosure*, No. 24220 (June, 1984) and the pyrazolopyrazole couplers disclosed in *Research Disclosure*, No. 24230 (June, 1984) can be cited. From the point of less yellow side absorption of the colored dye and light fastness, the imidazo[1,2-b]pyrazole couplers disclosed in European Patent 119741 are preferred, and the pyrazolo-[1,5-b][1,2,4]triazole coupler disclosed in European Patent 119860 is particularly preferred.

As the cyan couplers which can be used in the present invention, the naphthol based couplers disclosed in U.S. Pat. Nos. 2,474,293, 4,052,212, 4,146,396, 4,228,233 and 4,296, 200, the phenol based cyan couplers having an alkyl group of more than ethyl group at the meta-position of a phenol nucleus disclosed in U.S. Pat. No. 3,772,002, the 2,5-diacylamino-substituted phenol based couplers disclosed in U.S. Pat. Nos. 2,772,162, 3,758,308, 4,126,396, 4,334,011, 4,327,173, West German Patent Publication No. 3,329,729 and JP-B-3-18175, and the phenol based couplers having a phenyl-ureido group at the 2-position and an acylamino group at the 5-position disclosed in U.S. Pat. Nos. 3,446, 622, 4,333,999, 4,451,559 and 4,427,767 can be cited. The carbostyryl based coupler disclosed in JP-A-7-294714 is particularly excellent in heat resistance and light resistance and can be used in the present invention.

In addition to the above-described couplers, various couplers shown below can be used in the present invention.

Typical examples of polymerized dye-forming couplers are disclosed in U.S. Pat. Nos. 3,451,820, 4,080,211, 4,367, 282, and British Patent 2,102,137. In addition, mixed polymer couplers obtained by copolymerizing a cyan component and a yellow component, a magenta component and a yellow component, and a magenta component and a cyan component and the like as disclosed in U.S. patent application Ser. Nos. 08/755,739 and 08/745,856 can also be used in the present invention.

Couplers which release photographically useful residual groups upon coupling can also be preferably used in the present invention. The preferred DIR couplers which release development inhibitors are disclosed in the patents cited in the foregoing RD, No. 17643, Item VII-F, and JP-A-57-151944, JP-A-57-154234, JP-A-60-184248, and U.S. Pat. No. 4,248,962.

The couplers disclosed in British Patents 2,097,140, 2,131,188, JP-A-59-157638, and JP-A-59-170840 are preferred as couplers which imagewise release nucleating agents or development accelerators at the time of development.

Other couplers which can be used in the photosensitive material of the present invention include the competitive couplers disclosed in U.S. Pat. No. 4,130,427, the multi-equivalent couplers disclosed in U.S. Pat. Nos. 4,283,472, 4,338,393 and 4,310,618, the DIR redox compound releasing couplers disclosed in JP-A-60-185950, the couplers releasing dyes which restore colors after separation disclosed in EP 173302A.

The equivalent ratio of the silver halide to the coupler in each silver halide emulsion layer is preferably from 1 to 3, and when the silver halide emulsion having the average grain size of 0.9 μm or less, in particular, 0.5 μm or less, is used (in the case of tabular grains, defined in thickness), equivalent ratio of from 1 to 2 is more preferred. "Equivalent ratio" used herein means that, taking the theoretical amount of silver halide necessary to color all the couplers as equivalent ratio 1, for example, when silver halide is coated in the amount of 2 times of the theoretical amount, equivalent ratio is 2. That is, when 2-equivalent coupler is used, if the coating amount of silver is 2 mol to 1 mol of coupler, equivalent ratio is 1, and if the coating amount of silver is 4 mol, equivalent ratio is 2.

The above-described couplers for use in the present invention can be introduced into the photosensitive material using various known methods of dispersion.

Examples of high boiling point solvents which can be used in oil-in-water dispersion methods are disclosed in U.S. Pat. No. 2,322,027, etc. The amount of high boiling point solvents is 10 g or less to 1 g of couplers, preferably 5 g or less, and more preferably from 1 g to 0.01 g. Further, the amount of high boiling point solvents to the binder is 2 g or less to 1 g of the binder, preferably 1 g or less, and more preferably 0.5 g or less. The size of a coupler dispersion (an emulsified product of a coupler) obtained by an oil-in-water dispersion method is from 0.05 μm to 0.9 μm, and preferably from 0.1 μm to 0.5 μm.

The processes and effects of the latex dispersion method, and specific examples of latexes for impregnation are disclosed in U.S. Pat. No. 4,199,363, West German Patent Application (OLS) Nos. 2,541,274 and 2,541,230.

It is preferred to use the color image storage stability improving compounds as disclosed in EP 277589A2 in the layer containing couplers of the photosensitive material according to the present invention. In particular, the use in combination with pyrazoloazole based magenta couplers is preferred.

That is, compound (F) which produces a chemically inactive and substantially colorless compound by reacting with the aromatic amine based developing agent remaining after color development processing and/or compound (G) which produces a chemically inactive and substantially colorless compound by reacting with the oxidation product of the aromatic amine based color developing agent remaining after color development processing are preferably used in combination or alone to effectively prevent generation of stains during storage after processing which is due to formation of a colored dye by the reaction of a coupler with a color developing agent or its oxidation product remaining in the film, and to prevent other side reactions.

The silver halide emulsion layers or interlayers of the photosensitive material according to the present invention may contain hydroquinone derivatives, aminophenol derivatives, gallic acid derivatives, ascorbic acid derivatives, etc., as a color fog inhibitor or a color mixing preventive. Of such compounds, those hardly generate stains when heated to 160° to 200° C. are preferred.

Further, to prevent the deterioration of cyan dye images due to heat and, in particular, light, it is more effective to incorporate an ultraviolet absorber into a cyan color forming layer and both layers adjacent thereto.

Examples of ultraviolet absorbers which can be used in the present invention include aryl-substituted benzotriazole compounds (e.g., those disclosed in U.S. Pat. No. 3,533,794), 4-thiazolidone compounds (e.g., those disclosed in U.S. Pat. Nos. 3,314,794 and 3,352,681), benzophenone compounds (e.g., those disclosed in JP-A-46-2784), cinnamate compounds (e.g., those disclosed in U.S. Pat. Nos. 3,705,805 and 3,707,395), butadiene compounds (e.g., those disclosed in U.S. Pat. No. 4,045,229), and benzoxazole compounds (e.g., those disclosed in U.S. Pat. Nos. 3,406,070 and 4,271,307). Ultraviolet absorbing couplers (e.g., α-naphthol type cyan dye-forming couplers) and ultraviolet absorbing polymers may also be used. These ultraviolet absorbers may be mordanted to a specific layer. Above all, the foregoing aryl-substituted benzotriazole compounds are preferred.

It is also preferred for the photosensitive material of the present invention to contain the antibacterial and antifungal agents as disclosed in JP-A-63-271247 to prevent propagation of various bacteria and mold in a hydrophilic colloid layer which deteriorate images.

Gelatin is advantageously used as a binder or protective colloid for a silver halide emulsion layer, an interlayer, or a protective layer of the photosensitive material of the present invention. In addition to gelatin, other hydrophilic polymers can be used as well. Useful examples of the hydrophilic polymers include polyvinyl alcohol, partially acetalated polyvinyl alcohol, polyvinyl butyral, poly-N-vinylpyrrolidone, polyacrylic acid, polyacrylamide, polyvinylimidazole, polyvinylpyrazole, carrageenan, gum arabic, and cellulose derivatives such as hydroxyalkyl cellulose, carboxymethyl cellulose, cellulose sulfate, cellulose acetate hydrogen phthalate and sodium alginate, either as homopolymers or copolymers.

Further, graft polymers of gelatin and other polymers can also be used. Those grafted gelatin with homopolymers or copolymers of vinyl monomers such as acrylic acid, methacrylic acid, derivatives thereof such as esters and amides, acrylonitrile, and styrene can be used as graft polymers of gelatin. In particular, graft polymers with polymers compatible with gelatin in a certain degree, e.g., acrylic acid, methacrylic acid, acrylamide, methacrylamide, and hydroxyalkylmethacrylate are preferred. Examples thereof are disclosed in U.S. Pat. Nos. 2,763,625, 2,831,767, 2,956,884 and JP-A-56-65133.

As the representative synthetic hydrophilic high molecular weight compounds, those disclosed, for example, in West German Patent Application (OLS) No. 2,312,708, U.S. Pat. Nos. 3,620,751, 3,879,205 and JP-B-43-7561 can also be used.

The above hydrophilic polymers may be used alone or in combinations of two or more.

Useful examples of the gelatin include alkali-processed gelatin, acid-processed gelatin and enzyme-processed gelatin, or mixtures of them. Further, gelatin derivatives obtained by reacting gelatin with various compounds, e.g., acid halide, acid anhydride, isocyanates, bromoacetic acid, alkane sultonic acid, vinylsulfonamides, maleinimide compounds, polyalkylene oxides, epoxy compounds and the like can also be used. Specific examples of gelatin derivatives are disclosed in U.S. Pat. Nos. 2,614,928, 3,132,945, 3,186,846, 3,312,553, British Patents 861,414, 1,033,189, 1,005,784, and JP-B-42-26845, etc.

The total amount of the binder in the photosensitive material according to the present invention is preferably from 3 to 10 g/m$^2$, and the amount of the binder per one layer of a silver halide emulsion layer and an interlayer is preferably from 0.1 to 1.5 g/m$^2$, and particularly preferably from 0.2 to 1.0 g/m$^2$.

The support for use in the present invention is preferably a light transmitting substrate but the photosensitive material for a color filter may be formed by coating a silver halide emulsion layer on a different support and transferring and closely contacting it on the light transmitting substrate. In this case, the support is not necessarily light transmitting, for example, a support coated with carbon black on the back surface may be sufficient.

Further, the binder amount contained in a peeling-off layer or a backing layer provided in this case is not included in "the total amount of the binder" described above.

As examples of the materials constituting light transmitting substrates, those optically isotropic and excellent in heat resistance are preferred, for example, polyethylene terephthalate, polybutylene terephthalate, polyethylene naphthalate, polystyrene, polycarbonate, polyether sulfone, cellulose acetate, polyallylate, soda-lime glass, borosilicate glass, quartz, etc.

The surface of the substrate comprising these materials may be undercoated, if necessary. Further, the surface may be subjected to treatments such as glow discharge, corona discharge, or ultraviolet (UV) irradiation.

The light transmitting substrate can be used in the form of a plate, a sheet or a film. The thickness of the substrate can be set arbitrarily according to the intended uses and the materials, but is generally from 0.01 to 10 mm. For example, when the substrate is glass, the thickness is from 0.3 to 3 mm.

The photosensitive material for use in the present invention is color developed according to the general methods as disclosed in the foregoing RD, No. 17643, pages 28 and 29, and RD, No. 18716, page 651, from the left column to the right column, thus a microcolor filter can be obtained.

For example, a color development process, a desilvering process, and a water washing process are carried out. In the desilvering process, a bleach-fixing process using a bleach-fixing solution can be carried out instead of a bleaching process using a bleaching solution and a fixing process using a fixing solution. A bleaching process, a fixing process and a bleach-fixing process may be combined in an optional order. A stabilizing process may be conducted in place of a water washing process, or a stabilizing process may be carried out after a water washing process. Further, a mono-bath process can be carried out in which color development, bleaching and fixing are conducted in a monobath using a combined developing-bleaching-fixing solution. A pre-hardening process, a neutralization process, a stop-fixing process, a post-hardening process, a compensating process, an intensification process, etc., may be carried out in combination with these processes. In these processes, a so-called activator process may be carried out instead of a color development process.

A color development process and a desilvering process may be conducted combining a nucleating agent and light fogging using an internal latent image type autopositive emulsion, as described in JP-A-7-159610.

A development processor which is used for general photographic processing can be used as a development processing device when a support (a substrate) is flexible. When a support is rigid such as glass, a development processor for a dry plate of glass or the development device disclosed in JP-A-7-56015 can be used.

The color filter produced according to the method of the present invention can be coated with a protective layer (an overcoat layer) of a resin having heat resistance, waterproof ability and high specific electric resistivity as an outermost layer. Examples of such resins are disclosed in U.S. Pat. Nos. 4,171,979, 4,049,861, 4,333,998, 4,698,295, 4,668,601, EP 179636A, EP 556810A, JP-A-3-163416, JP-A-3-188153, JP-A-5-78443, JP-A-1-276101, JP-A-2-179638, JP-A-5-19115, JP-A-5-173012, JP-A-5-264811, JP-A-60-216307, JP-A-63-218771, JP-A-52-22099, JP-A-52-22100, JP-A-53-142447, JP-A-54-137072, JP-A-54-83999, JP-A-55-125104, JP-A-53-57023, JP-A-53-121100, JP-A-56-91233, JP-A-57-90489, JP-A-62-21150, JP-A-62-23042, JP-A-62-23043, JP-A-62-24256, JP-A-62-25758, JP-A-62-229133, etc.

The color filter produced according to the method of the present invention can further be provided with a transparent electrode (ITO) by evaporation coating, e.g., vacuum evaporation or sputtering.

An orientation coat of a polyimide resin or the like can further be provided thereon.

Moreover, a polarizing plate and a phase difference film may be provided on the opposite surface of the emulsion coated side of the light transmitting substrate of the color filter.

A plastic film substrate provided with a gas barrier layer or a hard coat layer can be used in place of a glass substrate as a light transmitting substrate.

Details of color LCD and producing methods are described in Shoichi Matsumoto and Ichiro Tsunoda, *Fundamentals and Applications of Liquid Crystal*, (published by Kogyo Chosakai, 1991), *Flat Panel Display*, 1994, compiled by Nikkei Microdevice (published by Nikkei BP Co., 1993), *Applied Physics*, Vol. 64, No. 10, page 1042 (1995), and JP-A-1-114820.

The present invention will be described with reference to Examples but the present invention is not limited thereto.

EXAMPLE 1

A preparing method of Photosensitive Silver Halide Emulsion (I) is described below.

Solution (I) shown in Table 2 below was added to the aqueous solution of gelatin having the composition shown in Table 1 below with thoroughly stirring for 1 minute. After 20 seconds from the commencement of the addition of Solution (I), Solution (II) was added over 40 seconds, and after 2 minutes therefrom, Solution (III) and Solution (IV) were added simultaneously over 4 minutes.

TABLE 1

| Composition of Aqueous Solution of Gelatin | |
| --- | --- |
| $H_2O$ | 650 cc |
| Lime-Processed Gelatin | 20 g |
| NaCl | 3 g |
| Silver Halide Solvent (1) | 0.015 g |
| Temperature | 40° C. |

TABLE 2

| | Solution (I) | Solution (II) | Solution (III) | Solution (IV) |
| --- | --- | --- | --- | --- |
| $AgNO_3$ | 20 g | | 80 g | |
| NaCl | | 4.91 g | | 29.5 g |
| Total Amount | $H_2O$ to make 120 cc | $H_2O$ to make 85.7 cc | $H_2O$ to make 480 cc | $H_2O$ to make 514 cc |

Silver Halide Solvent (1)

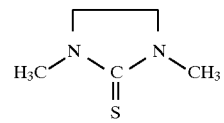

After water washing and demineralizing (conducted using Precipitant (a) at pH 4.0) according to an ordinary method, the emulsion was dispersed by adding 22 g of deliming processed gelatin. After adjusting the pH to 6.0, 4 cc of a 10% aqueous solution of sodium chloride was added thereto, further, 70 mg of Preservative (1) was added to obtain a silver chloride emulsion having a grain size of 0.15 μm. The yield of the emulsion was 630 g.

Precipitant (a)

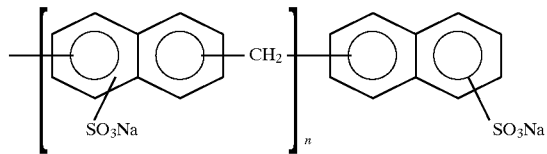

n = 3~4

Preservative (1)

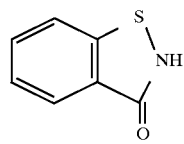

A preparing method of Silver Halide Emulsion (II) is described below.

A silver chlorobromide emulsion having a silver chloride content of 70 mol % was prepared in the same manner as the preparation of Silver Halide Emulsion (I) except for changing the compositions of the aqueous solution of gelatin, Solution (I) and Solution (II) as shown in Tables 3 and 4 below, respectively.

TABLE 3

Composition of Aqueous Solution of Gelatin

| | |
|---|---|
| $H_2O$ | 650 cc |
| Lime-Processed Gelatin | 20 g |
| NaCl | 3 g |
| KBr | 0.3 g |
| Silver Halide Solvent (1) | 0.015 g |
| Temperature | 40° C. |

TABLE 4

| | Solution (I) | Solution (II) | Solution (III) | Solution (IV) |
|---|---|---|---|---|
| $AgNO_3$ | 20 g | | 80 g | |
| NaCl | | 3.46 g | | 20.7 g |
| KBr | | 3.0 g | | 18.0 g |
| Total Amount | $H_2O$ to make 120 cc | $H_2O$ to make 85.7 cc | $H_2O$ to make 480 cc | $H_2O$ to make 514 cc |

A polyethylene terephthalate support having a thickness of 100 μm whose back side had been coated with carbon black dispersed in vinyl chloride as a backing layer was undercoated with gelatin, and the first to eighth layers of the constitution shown below were multilayer coated thereon, thus, Color Photosensitive Material 1A was prepared. The components and the coating amounts (unit: $g/m^2$) are shown below. The coating amount of the silver halide emulsion is indicated in terms of silver.

First Layer (peeling off layer)

| | |
|---|---|
| Hydroxyethyl Cellulose (HEC-SP500, (manufactured by Daicel Chemical Industries Ltd.) | 0.35 |
| Terminal Alkyl Modified Polyvinyl Alcohol (average polymerization degree: 300) | 0.08 |
| Antistatic Agent (Cpd-1) | 0.03 |

Second Layer (adjacent layer to gelatin)

| | |
|---|---|
| Gelatin | 0.60 |

Third Layer (blue-sensitive layer)

| | |
|---|---|
| Silver Halide Emulsion (II) Spectrally Sensitized with Blue Sensitizing Dyes (ExS-1 and -2) | 0.33 |
| Gelatin | 1.00 |
| Blue Coupler (ExB-1) | 0.57 |
| Ultraviolet Absorber (Cpd-6) | 0.03 |
| Ultraviolet Absorber (Cpd-7) | 0.08 |
| High Boiling Point Solvent (Solv-1) | 0.23 |

Fourth Layer (interlayer)

| | |
|---|---|
| Gelatin | 0.38 |
| Color Mixing Preventive (Cpd-2) | 0.02 |
| Color Mixing Preventive (Cpd-10) | 0.09 |
| High Boiling Point Solvent (Solv-1) | 0.03 |
| High Boiling Point Solvent (Solv-3) | 0.01 |
| Ultraviolet Absorber (Cpd-8) | 0.02 |
| Ultraviolet Absorber (Cpd-7) | 0.02 |
| Ultraviolet Absorber (Cpd-6) | 0.01 |
| Ultraviolet Absorber (Cpd-9) | 0.02 |
| Antistaining Agent (Cpd-11) | 0.04 |
| Yellow Dye (YF-1) | 0.17 |

Fifth Layer (green-sensitive layer)

| | |
|---|---|
| Silver Halide Emulsion (I) Spectrally Sensitized with Green Sensitizing Dye (ExS-3) | 0.43 |
| Gelatin | 1.09 |
| Cyan Coupler (ExC-1) | 0.33 |
| Yellow Coupler (ExY-1) | 0.43 |
| Discoloration Inhibitor (Cpd-5) | 0.01 |
| Antistaining Agent (Cpd-13) | 0.01 |
| High Boiling Point Solvent (Solv-1) | 0.08 |
| High Boiling Point Solvent (Solv-2) | 0.11 |
| Polymer (Cpd-14) | 0.03 |

Sixth Layer (interlayer)

| | |
|---|---|
| Gelatin | 0.38 |
| Color Mixing Preventive (Cpd-2) | 0.02 |
| Color Mixing Preventive (Cpd-10) | 0.09 |
| High Boiling Point Solvent (Solv-1) | 0.03 |
| High Boiling Point Solvent (Solv-3) | 0.01 |
| Ultraviolet Absorber (Cpd-8) | 0.02 |
| Ultraviolet Absorber (Cpd-7) | 0.02 |
| Ultraviolet Absorber (Cpd-6) | 0.01 |
| Ultraviolet Absorber (Cpd-9) | 0.02 |
| Antistaining Agent (Cpd-11) | 0.04 |
| Irradiation Preventing Dye (Dye-1) | 0.03 |
| Irradiation Preventing Dye (Dye-2) | 0.02 |

Seventh Layer (red-sensitive layer)

| | |
|---|---|
| Silver Halide Emulsion (I) Spectrally Sensitized with Red Sensitizing Dyes (ExS-4, -5) | 0.31 |
| Gelatin | 0.77 |
| Red Polymer Coupler (ExR-1) | 1.60 |
| Discoloration Inhibitor (Cpd-3) | 0.04 |
| Discoloration Inhibitor (Cpd-4) | 0.005 |
| Discoloration Inhibitor (Cpd-5) | 0.01 |
| High Boiling Point Solvent (Solv-1) | 0.13 |
| High Boiling Point Solvent (Solv-2) | 0.03 |
| High Boiling Point Solvent (Solv-4) | 0.12 |

Eighth Layer (protective layer)

| | |
|---|---|
| Gelatin | 0.70 |
| Antihalation Dye | 0.17 |
| Carboxymethyl Cellulose | 0.05 |
| Polymer (Cpd-15) | 0.14 |
| Surfactant (Cpd-16) | 0.03 |
| Hardening Agent (H-1) | 0.12 |

Sodium dodecylbenzenesulfonate as an emulsifying dispersion aid, ethyl acetate as an auxiliary solvent, Surfactant (Cpd-17) as a coating aid, and further, potassium polystyrenesulfonate as a thickener were added to each layer.

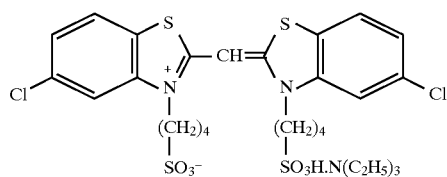 ExS-1
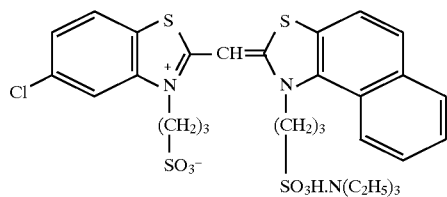 ExS-2
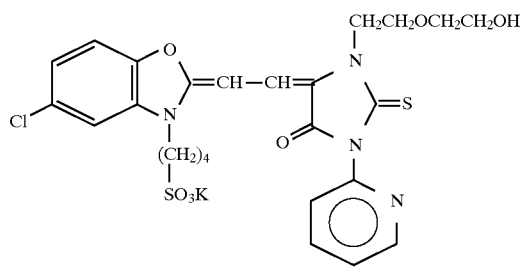 ExS-3
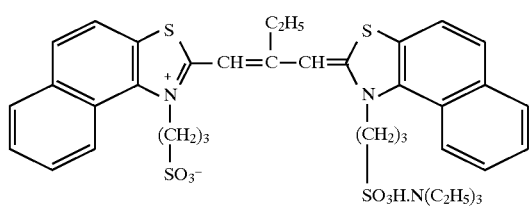 ExS-4
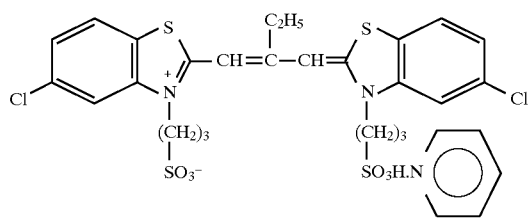 ExS-5
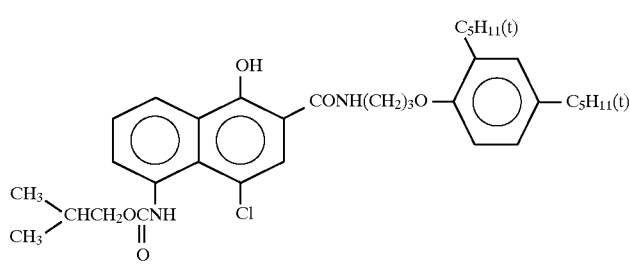 ExC-1
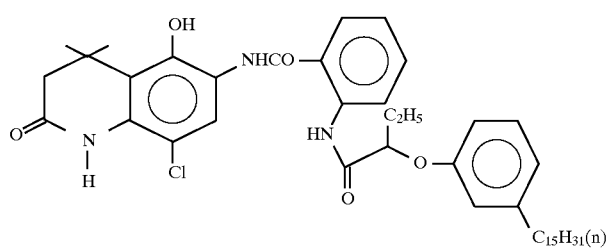 ExB-1

-continued
ExY-1
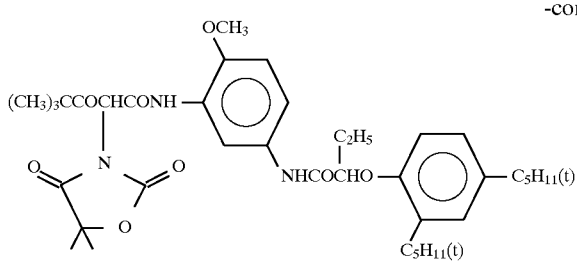
(coupler component/BA = 50/50 percent by weight)
ExR-1
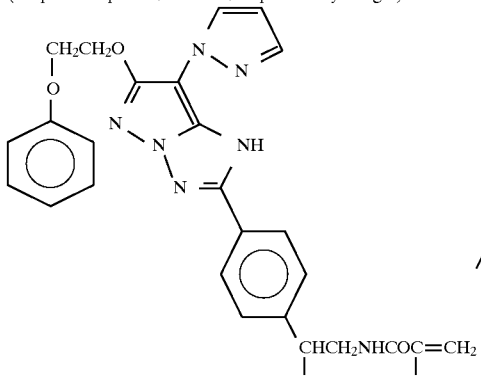
(1 mol)
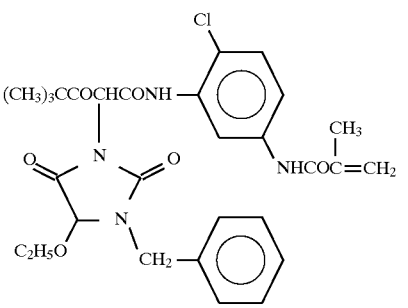
(3 mol)
BA: Butyl Acrylate
Cpd-1
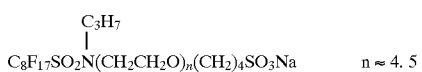    n ≈ 4.5
Cpd-2
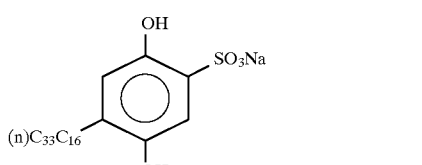
Cpd-3
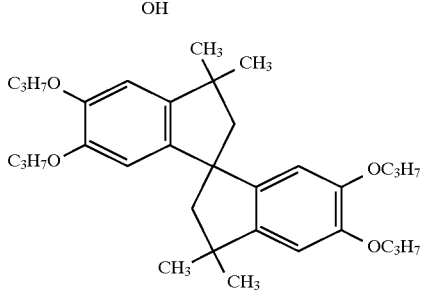
Cpd-4
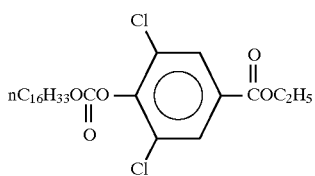
Cpd-5
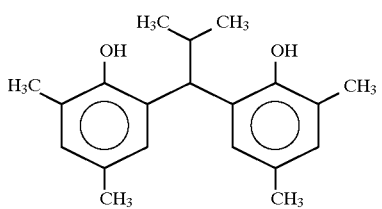

-continued
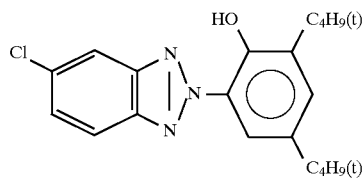
Cpd-6
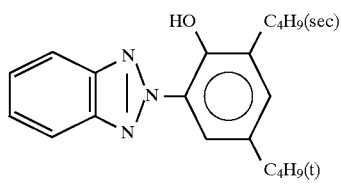
Cpd-7
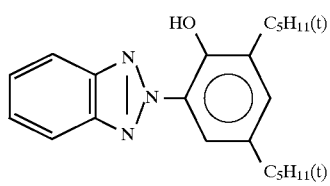
Cpd-8
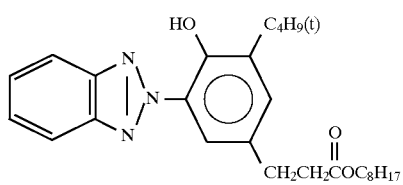
Cpd-9
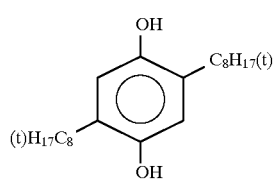
Cpd-10
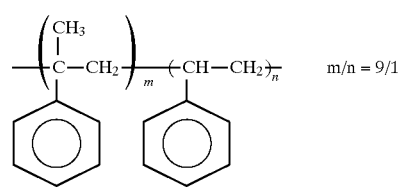
Cpd-11
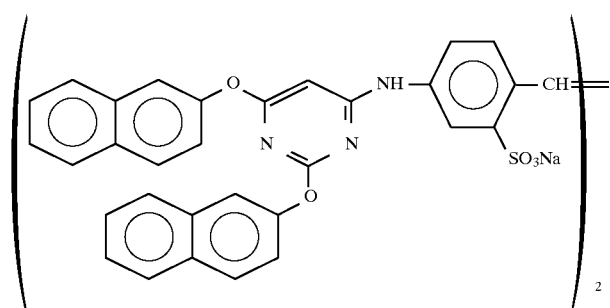
Cpd-12
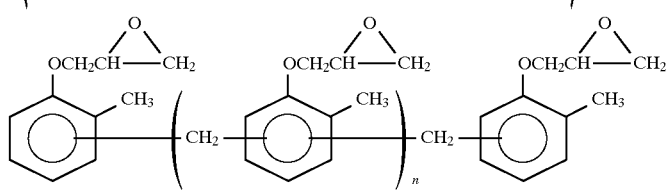
Cpd-13

-continued
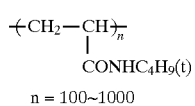 Cpd-14
n = 100~1000
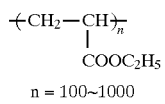 Cpd-15
n = 100~1000
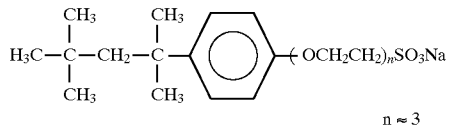 Cpd-16
n ≈ 3
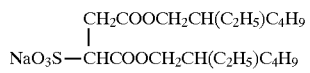 Cpd-17
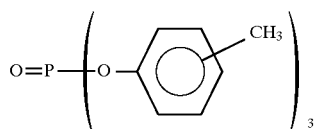 Solv-1
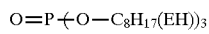 Solv-2
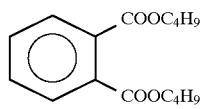 Solv-3
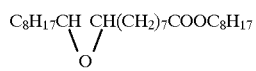 Solv-4
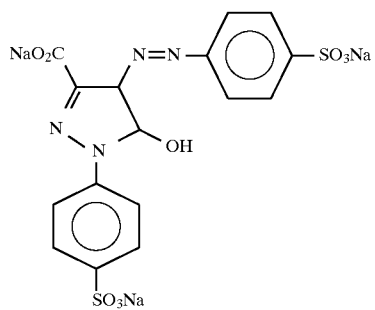 YF-1
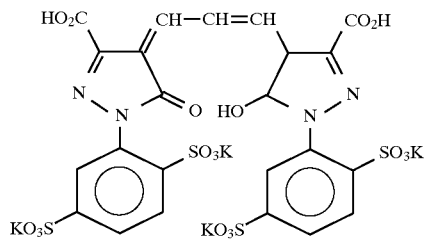 Dye-1
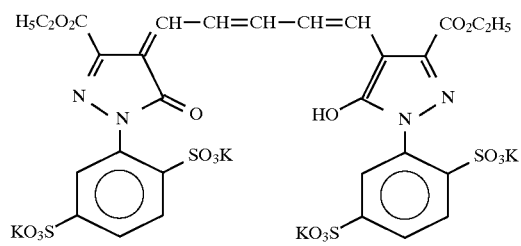 Dye-2
 H-1
Antihalation dye

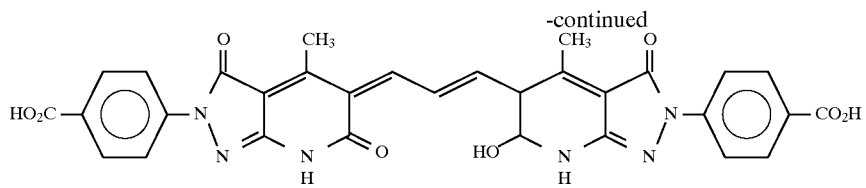

Color Photosensitive Material 1B was prepared which had the same constitution as Color Photosensitive Material 1A except that the coating amount of each composition of the third layer (blue-sensitive layer) was changed to 1.1 times and the coating amount of each composition of the seventh layer (red-sensitive layer) to 2 times.

Transparent alkali-free glass (20 cm×30 cm) having a thickness of 1.1 mm was used as a light transmitting substrate. Gelatin and colloidal silica (average particle size: 7 to 9 mµ) were mixed in a weight ratio of 1/3, saponin was added thereto as a surfactant and the solution was coated on the surface of the substrate. Coating thickness of the dry film was 0.2 µm.

The protective layer of the foregoing color photosensitive material was closely contacted with the coated face of the light transmitting substrate. Subsequently, the temperature of the contact face was set up to become 130° C. using a laminator, and the substrate with the photosensitive material was passed at a line speed of 0.45 m/min. After the material was cooled to about room temperature, the support of the photosensitive material was peeled off from the emulsion face with the peeling off layer. The emulsion faces upper from the second layer were adhered uniformly on the substrate and white vacancy was not seen.

The thus prepared substrate having the emulsion layer was digitally exposed with an He-Cd laser (B light), a green semiconductor exciting laser (using SHG), and an He-Ne laser (R light) from the emulsion face side. Specifically, the red, green and blue pixel parts each were digitally exposed with a quantity of light so that the white balance is kept. Each of the light amount required to expose the red, green and blue pixel parts was doubled to digitally expose the black matrix part. The exposed substrate was development processed according to the following step, and the color filter colored B, G, R and black was prepared by one operation.

| Processing Step | Temperature | Time |
| --- | --- | --- |
| Hardening Process | 38° C. | 3 min |
| Water Washing-1 | 35° C. | 1 min |
| Color Development | 38° C. | 80 sec |
| Bleach-Fixing | 38° C. | 90 sec |
| Water Washing-2 | 35° C. | 40 sec |
| Water Washing-3 | 35° C. | 40 sec |
| Drying | 60° C. | 2 min |

Composition of each processing solution is as follows.

Hardening Solution

| Sodium Sulfate (anhydrous) | 160.0 g |
| --- | --- |
| Sodium Carbonate (anhydrous) | 4.6 g |
| Glyoxal-Propylene Glycol Addition Product (55%) | 20.0 ml |
| Water to make | 1 liter |
| pH (25° C.) | 9.5 |

Color Developing Solution

| Water | 800 ml |
| --- | --- |
| D-Sorbitol | 0.15 g |
| Sodium Naphthalenesulfonate-Formalin Condensation Product | 0.15 g |
| Pentasodium Nitrilo-tris(methylenephosphonate) | 1.8 g |
| Diethylenetriaminepentaacetic Acid | 0.5 g |
| 1-Hydroxyethylidene-1,1-disulfoic Acid | 0.15 g |
| Diethylene Glycol | 12.0 ml |
| Benzyl Alcohol | 13.5 ml |
| Potassium Chloride | 6.5 g |
| Potassium Bromide | 0.1 g |
| Potassium Carbonate | 30.0 g |
| Sodium Sulfite | 2.4 g |
| Disodium-N,N-bis(sulfonatoethyl)hydroxylamine | 8.0 g |
| Triethanolamine | 6.0 g |
| Benzotriazole | 0.01 g |
| N-Ethyl-N-(β-methanesulfonamidoethyl)-3-methyl-4-aminoaniline.3/2 Sulfuric Acid. Monohydrate | 6.0 g |
| Water to make | 1 liter |
| pH (25° C.) | 10.6 |

Bleach-Fixing Solution

| Water | 600 ml |
| --- | --- |
| Ammonium Thiosulfate (750 g/liter) | 160 ml |
| Ammonium Sulfite | 40.0 g |
| Ammonium Ethylenediaminetetraacetato Ferrate | 55.0 g |
| Ethylenediaminetetraacetic Acid | 5.0 g |
| Ammonium Nitrate | 10.0 g |
| Ammonium Bromide | 25.0 g |
| Water to make | 1 liter |
| pH (25° C.) | 6.0 |

Washing Water

Deionized Water (electric conductivity: 5 µS or less)

Both of the obtained Color Filters 1A and 1B showed no color turbidity and were possessed of RGB pattern of an excellent spectral transmission characteristic. However, with respect to the black matrix part, the magenta density of 1A was low and could not be said to be substantially black, on the contrary the transmission density of 1B was 3.0 or more and the black matrix part was substantially black.

EXAMPLE 2

A preparing method of photosensitive silver halide emulsion is described below. The same compounds as used in Example 1 were used unless otherwise indicated.

Photosensitive Silver Halide Emulsion (III) (emulsion for the third layer (680 nm light-sensitive layer)

Solution (I) and Solution (II) each having the composition shown in Table 6 below were simultaneously added to the aqueous solution having the composition shown in Table 5 below with thoroughly stirring over 13 minutes. After 10 minutes therefrom, Solutions (III) and (IV) each having the composition shown in Table 6 were added thereto over 33 minutes.

TABLE 5

Composition of Aqueous Solution

| | |
|---|---|
| $H_2O$ | 620 cc |
| Lime-Processed Gelatin | 20 g |
| KBr | 0.3 g |
| NaCl | 2 g |
| Silver Halide Solvent (1) | 0.030 g |
| Sulfuric Acid (1N) | 16 cc |
| Temperature | 45° C. |

TABLE 6

| | Solution (I) | Solution (II) | Solution (III) | Solution (IV) |
|---|---|---|---|---|
| $AgNO_3$ | 30.0 g | — | 70.0 g | — |
| KBr | — | 13.7 g | — | 44.2 g |
| NaCl | — | 3.62 g | — | 2.4 g |
| $K_2IrCl_6$ | — | — | — | 0.039 mg |
| Total Amount | $H_2O$ to make 126 ml | $H_2O$ to make 132 ml | $H_2O$ to make 254 ml | $H_2O$ to make 252 ml |

Further, after 13 minutes from the commencement of the addition of Solution (III), 150 cc of an aqueous solution containing 0.350% of Sensitizing Dye (ExS-4) was added over 27 minutes.

After water washing and demineralizing (conducted using Precipitant (a) at pH 4.1) according to an ordinary method, 22 g of lime-processed ossein gelatin was added and pH was adjusted to 6.0 and pAg to 7.9, subsequently, chemical sensitization was carried out at 60° C. The compounds used in the chemical sensitization are shown in Table 7 below. Thus, a monodisperse cubic silver chlorobromide emulsion having a variation coefficient of 10.2% and an average grain size of 0.20 μm was obtained. The yield was 630 g.

TABLE 7

| Compound Used in Chemical Sensitization | Addition Amount |
|---|---|
| 4-Hydroxy-6-methyl-1,3,3a,7-tetraazaindene | 0.36 g |
| Sodium Thiosulfate | 6.75 mg |
| Antifoggant (1) | 0.11 g |
| Preservative (1) | 0.07 g |
| Preservative (2) | 3.13 g |

Antifoggant (1)

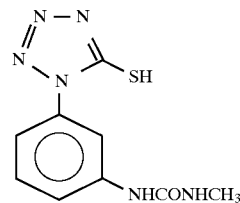

Preservative (2)

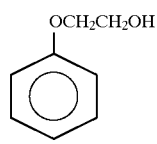

Photosensitive Silver Halide Emulsion (IV) (emulsion for the fifth layer (750 nm light-sensitive layer)

Solution (I) and Solution (II) each having the composition shown in Table 9 below were simultaneously added to the aqueous solution having the composition shown in Table 8 below with thoroughly stirring over 18 minutes. After 10 minutes therefrom, Solutions (III) and (IV) each having the composition shown in Table 9 were added thereto over 24 minutes.

TABLE 8

Composition of Aqueous Solution

| | |
|---|---|
| $H_2O$ | 650 cc |
| Lime-Processed Gelatin | 20 g |
| KBr | 0.3 g |
| NaCl | 2 g |
| Silver Halide Solvent (1) | 0.030 g |
| Sulfuric Acid (1 N) | 16 cc |
| Temperature | 45° C. |

TABLE 9

| | Solution (I) | Solution (II) | Solution (III) | Solution (IV) |
|---|---|---|---|---|
| $AgNO_3$ | 30.0 g | — | 70.0 g | — |
| KBr | — | 13.7 g | — | 44.2 g |
| NaCl | — | 3.62 g | — | 2.4 g |
| $K_2[Fe(CN)_6].H_2O$ | — | — | — | 0.07 g |
| $K_2IrCl_6$ | — | — | — | 0.040 mg |
| Total Amount | $H_2O$ to make 188 ml | $H_2O$ to make 188 ml | $H_2O$ to make 250 ml | $H_2O$ to make 250 ml |

After water washing and demineralizing (conducted using Precipitant (b) at pH 3.9) according to an ordinary method, 22 g of decalcium-processed lime-processed ossein gelatin (content of calcium: 150 ppm or less) was added and dispersed again at 40° C., then 0.39 g of 4-hydroxy-6-methyl-1,3,3a,7-tetraazaindene was added and pH was adjusted to 5.9 and pAg to 7.8. Subsequently, chemical sensitization was carried out at 70° C. using the compounds shown in Table 10 below. Further, at the final stage of the chemical sensitization, Sensitizing Dye (ExS-6) dissolved in a solution of methanol (the solution having the composition shown in Table 11 below) was added to the emulsion. After chemical sensitization, the temperature was lowered to 40° C. and 200 g of a gelatin dispersion of Stabilizer (Cpd-12) was further added thereto, and the emulsion was stirred thoroughly and recovered. Thus, a monodisperse cubic silver chlorobromide emulsion having a variation coefficient of 12.6% and an average grain size of 0.25 μm was obtained. The yield was 938 g. The emulsion for 750 nm light-sensitive layer had J-band type spectral sensitivity.

TABLE 10

| Compound Used in Chemical Sensitization | Addition Amount |
|---|---|
| 4-Hydroxy-6-methyl-1,3,3a,7-tetraazaindene | 0.39 g |
| Triethylthiourea | 3.3 mg |
| Nucleic Acid Dispersion | 0.39 g |
| NaCl | 0.15 g |
| KI | 0.12 g |
| Antifoggant (2) | 0.10 g |
| Preservative (1) | 0.07 g |

TABLE 11

| Composition of Dye Solution | Addition Amount |
| --- | --- |
| Sensitizing Dye (EXS-6) | 0.19 g |
| Methanol | 18.7 cc |

Precipitant (b)

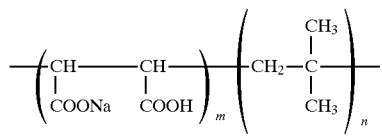

Antifoggant (2)

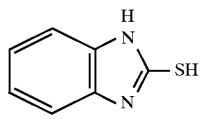

Sensitizing Dye (ExS-6)

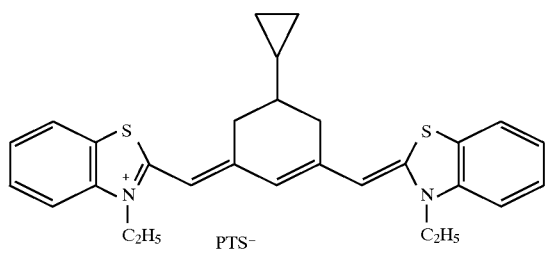

PTS = p-Toluenesulfonic Acid

Photosensitive Silver Halide Emulsion (V) (emulsion for the seventh layer (810 nm light-sensitive layer)

Solution (I) and Solution (II) each having the composition shown in Table 13 below were simultaneously added to the aqueous solution having the composition shown in Table 12 below with thoroughly stirring over 18 minutes. After 10 minutes therefrom, Solutions (III) and (IV) each having the composition shown in Table 13 were added thereto over 24 minutes.

TABLE 12

| Composition of Aqueous Solution | |
| --- | --- |
| $H_2O$ | 650 cc |
| Lime-Processed Gelatin | 20 g |
| KBr | 0.3 g |
| NaCl | 2 g |
| Silver Halide Solvent (1) | 0.030 g |
| Sulfuric Acid (1 N) | 16 cc |
| Temperature | 50° C. |

TABLE 13

| | Solution (I) | Solution (II) | Solution (III) | Solution (IV) |
| --- | --- | --- | --- | --- |
| $AgNO_3$ | 30.0 g | — | 70.0 g | — |
| KBr | — | 13.7 g | — | 44.1 g |
| NaCl | — | 3.62 g | — | 2.4 g |
| $K_2IrCl_6$ | — | — | — | 0.020 mg |
| Total Amount | $H_2O$ to make 180 ml | $H_2O$ to make 181 ml | $H_2O$ to make 242 ml | $H_2O$ to make 250 ml |

After water washing and demineralizing (conducted using Precipitant (a) at pH 3.8) according to an ordinary method, 22 g of lime-processed ossein gelatin was added and pH was adjusted to 7.4 and pAg to 7.8, subsequently, chemical sensitization was carried out at 60° C. The compounds used in the chemical sensitization are shown in Table 14 below.

Thus, a monodisperse cubic silver chlorobromide emulsion having a variation coefficient of 9.7% and an average grain size of 0.32 μm was obtained. The yield was 680 g. Subsequently, spectral sensitization was carried out by adding Sensitizing Dye (ExS-7).

TABLE 14

| Compound Used in Chemical Sensitization | Addition Amount |
| --- | --- |
| 4-Hydroxy-6-methyl-1,3,3a,7-tetraazaindene | 0.38 g |
| Triethylthiourea | 3.10 mg |
| Antifoggant (2) | 0.19 g |
| Preservative (1) | 0.07 g |
| Preservative (2) | 3.13 g |

Sensitizing Dye (ExS-7)

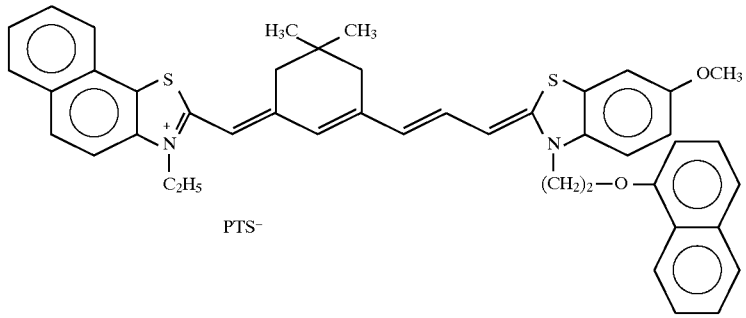

On one side of an optically isotropic polyallylate substrate having a thickness of 100 μm was coated with a hard coat layer, the surface of the opposite side was glow discharge treated and an SBR latex layer and a gelatin layer were coated to improve the adhesion with the photographic emulsion layer. The first to eighth layers of the constitution shown below were multilayer coated thereon, thus, Color Photosensitive Material 2A was prepared. The components and the coating amounts (unit: g/m$^2$) are shown below. The coating amounts of the silver halide and the colloidal silver emulsion are indicated in terms of silver.

First Layer (antihalation layer)

| | |
|---|---|
| Gelatin | 0.70 |
| Colloidal Silver Emulsion | 0.20 |
| (average grain size: 0.02 μm) | |
| Hardening Agent (H-1) | 0.06 |

Second Layer (interlayer)

| | |
|---|---|
| Gelatin | 0.50 |

Third Layer (red-sensitive layer)

| | |
|---|---|
| Silver Halide Emulsion (III) Spectrally Sensitized with Red Sensitizing Dye (ExS-4) | 0.33 |
| Gelatin | 1.00 |
| Blue Coupler (EXC-2) | 0.57 |
| High Boiling Point Solvent (Solv-1) | 0.23 |

Fourth Layer (interlayer)

| | |
|---|---|
| Gelatin | 0.38 |
| Color Mixing Preventive (Cpd-2) | 0.02 |
| Color Mixing Preventive (Cpd-10) | 0.09 |
| High Boiling Point Solvent (Solv-1) | 0.03 |
| High Boiling Point Solvent (Solv-3) | 0.01 |
| Ultraviolet Absorber (Cpd-8) | 0.02 |
| Ultraviolet Absorber (Cpd-7) | 0.02 |
| Ultraviolet Absorber (Cpd-6) | 0.01 |
| Ultraviolet Absorber (Cpd-9) | 0.02 |
| Antistaining Agent (Cpd-11) | 0.04 |

Fifth Layer (infrared-sensitive layer)

| | |
|---|---|
| Silver Halide Emulsion (IV) Spectrally Sensitized with Infrared Sensitizing Dye (ExS-6) | 0.43 |
| Gelatin | 1.09 |
| Cyan Coupler (ExC-1) | 0.33 |
| Yellow Coupler (ExY-1) | 0.43 |
| Discoloration Inhibitor (Cpd-5) | 0.01 |
| Antistaining Agent (Cpd-13) | 0.01 |
| High Boiling Point Solvent (Solv-1) | 0.08 |
| High Boiling Point Solvent (Solv-2) | 0.11 |
| Polymer (Cpd-14) | 0.03 |
| Hardening Agent (H-1) | 0.06 |

Sixth Layer (interlayer)

| | |
|---|---|
| Gelatin | 0.38 |
| Color Mixing Preventive (Cpd-2) | 0.02 |
| Color Mixing Preventive (Cpd-10) | 0.09 |
| High Boiling Point Solvent (Solv-1) | 0.03 |
| High Boiling Point Solvent (Solv-3) | 0.01 |
| Ultraviolet Absorber (Cpd-8) | 0.02 |
| Ultraviolet Absorber (Cpd-7) | 0.02 |
| uitraviolet Absorber (Cpd-6) | 0.01 |
| Uitraviolet Absorber (Cpd-9) | 0 02 |
| Antistaining Agent (Cpd-11) | 0.04 |

Seventh Layer (infrared-sensitive layer)

| | |
|---|---|
| Silver Halide Emulsion (V) Spectrally Sensitized with Infrared Sensitizing Dye (ExS-7) | 0.31 |
| Gelatin | 0.77 |
| Red Polymer Coupler (ExR-1) | 1.60 |
| Discoloration Inhibitor (Cpd-3) | 0.04 |
| Discoloration Inhibitor (Cpd-4) | 0.005 |
| Discoloration Inhibitor (Cpd-5) | 0.01 |
| Ultraviolet Absorber (Cpd-6) | 0.03 |
| Ultraviolet Absorber (Cpd-7) | 0.08 |
| High Boiling Point Solvent (Solv-1) | 0.13 |
| High Boiling Point Solvent (Solv-2) | 0.03 |
| High Boiling Point Solvent (Solv-4) | 0.12 |

Eighth Layer (protective layer)

| | |
|---|---|
| Gelatin (acid-processed) | 0.31 |
| Antistatic Agent (Cpd-1) | 0.03 |

Sodium dodecylbenzenesulfonate as an emulsifying dispersion aid, ethyl acetate as an auxiliary solvent, Surfactant (Cpd-17) as a coating aid, and further, potassium polystyrenesulfonate as a thickener were added to each layer.

Color Photosensitive Material 2B was prepared which had the same constitution as Color Photosensitive Material 2A except that the coating amount of each composition other than gelatin of the third layer (red-sensitive layer) was changed to 1.2 times, the coating amount of each composition other than gelatin of the fifth layer (infrared-sensitive layer) to 1.1 times, and the coating amount of the red polymer coupler of the seventh layer (infrared-sensitive layer) to 2 times.

The above color photosensitive material was digitally exposed with infrared and red semiconductor laser. Specifically, the red, green and blue pixel parts each were digitally exposed with a quantity of light so that the white balance is kept. Each of the light amount required to expose the red, green and blue pixel parts was doubled to digitally expose the black matrix part. The exposed material was development processed according to the following step, and the color filter colored B, G, R and black was prepared by one operation. Each processing solution used was the same as used in Example 1.

| Processing Step | Temperature | Time |
|---|---|---|
| Color Development | 38° C. | 80 sec |
| Bleach-Fixing | 38° C. | 90 sec |
| Water Washing-2 | 35° C. | 40 sec |
| Water Washing-3 | 35° C. | 40 sec |
| Drying | 60° C. | 2 min |

Both of the obtained Color Filters 2A and 2B showed no color turbidity and were possessed of RGB pattern of an excellent spectral transmission characteristic. However, with respect to the black matrix part, the magenta density of 2A was low and could not be said to be substantially black, on the contrary the transmission density of 2B was 3.0 or more and the black matrix part was substantially black. An overcoat layer was provided on this color filter layer by coating an ultraviolet curable resin layer. Further, a color liquid crystal panel was produced by providing a transparent electrode and the like using a plastic film substrate on the opposite surface of the color filter layer-coated side of the polyallylate substrate.

The present invention can provide a color filter which has a thin film thickness, is less in color turbidity, has red, green and blue parts excellent in a spectral transmission characteristic, and a black part of high optical density (black matrix). Further, the present invention can provide a color filter which does not need a complicated producing process, in which defects are less, and is suitable for mass production.

While the invention has been described in detail and with reference to specific examples thereof, it will be apparent to one skilled in the art that various changes and modifications can be made therein without departing from the spirit and scope thereof.

What is claimed is:

1. A silver halide photosensitive material for a color filter, comprising at least three silver halide emulsion layers having different spectral sensitivities, each silver halide emulsion layer containing couplers which form blue, green and red by coupling reaction with the oxidation product of a developer, wherein the amount of couplers in a red coloring layer is adjusted so that each transmission density of yellow and magenta dye components measured when all the couplers in the red coloring layer are subjected to color development is 1.5 or more, and a black matrix part becomes substantially black of transmission density of 2.5 or more when all the couplers on a support are subjected to reaction.

2. A method for producing a color filter having blue, green and red pixel patterns and a black matrix, comprising exposing the silver halide photosensitive material of claim 1 using a laser beam or a light emitting diode so that the blue, green and red pixel patterns are exposed with a smaller quantity of light than the black matrix, color developing and desilvering.

3. A color filter produced by a method for producing a color filter having blue, green and red pixel patterns and a black matrix, comprising exposing the silver halide photosensitive material of claim 1 using a laser beam or a light emitting diode so that the blue, green and red pixel patterns are exposed with a smaller quantity of light than the black matrix, color developing and desilvering.

* * * * *

UNITED STATES PATENT AND TRADEMARK OFFICE
CERTIFICATE OF CORRECTION

PATENT NO. : 5,817,440
DATED : October 6, 1998
INVENTOR(S) : Hirai, et al

It is certified that error appears in the above-identified patent and that said Letters Patent is hereby corrected as shown below:

On the title page, insert the following:

-- [30]  Foreign Application Priority Data

Feb. 23, 1996 [JP] ..........................8-60346
        Mar. 8, 1996 [JP] ..........................8-79374   --

Signed and Sealed this

Sixteenth Day of February, 1999

Attest:

*Attesting Officer*

*Acting Commissioner of Patents and Trademarks*